United States Patent Office 3,783,099
Patented Jan. 1, 1974

3,783,099
XANTHOPHYLLIC EXTRACTION PROCESS
Ralph F. Matoushek, St. Louis, Mo., assignor to Ralston Purina Company, St. Louis, Mo.
No Drawing. Filed Nov. 8, 1971, Ser. No. 196,766
Int. Cl. C12b 1/00
U.S. Cl. 195—2                                                 4 Claims

ABSTRACT OF THE DISCLOSURE

A process for the extraction of xanthophyllic pigments from plants is provided which includes the hydrolysis of the plant cellulosic material with a cellulase enzyme.

---

This invention relates to an improved process for the extraction of carotenoid pigments from the plants.

Carotenoids, especially xanthophyllic members of that group of pigments, are commonly found in many living organisms. The xanthophylls are found in legumes such as alfalfa, cereals such as corn, and in the petals of marigold flowers. These pigments, when found in animals, are located in or with lipoid deposits and tend to color these deposits by their presence. This effect is desirable in the case of chickens where yellow colored chicken fat and orange colored egg yolks is preferred.

It has, therefore, been a common practice to utilize xanthophyllic pigments obtained from plants as a feed supplement for chickens. Previously, xanthophyllic pigments have been extracted from marigolds, alfalfa and the like by contacting the dried, ground, pigment-containing material with a suitable organic solvent and then physically removing the cellulosic residue from the pigment-containing solvent solution. (While it is possible to feed non-extracted whole or ground xanthophyllic-containing parts of plants, e.g. marigold petals, there is approximately a 30% increase in pigment availability when the plant extracts are used.) Solvent extraction, however, has its disadvantages.

Drying, used in conjunction with solvent extraction, causes some destruction of xanthophylls. While there are variances on the solvent extraction concept, these processes depend for their effectiveness upon the severity of the extraction procedure. The more rigorous the extraction procedure, the higher the level of xanthophylls extracted. However, such extraction procedures may produce chemical changes in the xanthophylls which could be deleterious. Gentle extraction procedures which eliminate that problem are, however, relatively inefficient and remove relatively small quantities of xanthophylls.

It has now been found that large quantities of xanthophylls having high levels of biological activity can be obtained by combining a gentle solvent extraction with treatment of the appropriate plant materials with a cellulase enzyme.

The process of this invention involves treating a plant source rich in xanthophylls, e.g. marigold petals, in the following manner. First, cellulase is added to the fresh or frozen plant materials (the plant being either ground or unground) in aqueous solution. This mixture is then acidified to a pH of from 4 to 6 and maintained at that level for the duration of the process. (A commercially available buffer solution may be used to maintain the mixture at a specific pH level. A pH of 4.5 is currently preferred.) An alternative is direct acidification with any of a large variety of acids, with the only caveats being, first that the acids in the strength used, do not deleteriously affect the pigments and secondly, that the so-called fatty acids be avoided because of their tendency to form esters with the xanthophylls).

The mixture is then incubated, preferably, at temperatures designed to provide maximum hydrolytic effect without enzyme inactivation. While the temperatures will vary with the source of enzyme, generally temperatures between 45° C. and 55° C. are desirable. Hydrolysis proceeds for periods ranging from 4 to 24 hours depending upon such factors as the amount of strength of the enzyme used and the holding temperature. Generall, a period of 16 hours for the hydrolysis, plus or minus one hour, has been found to be a good average time.

After hydrolysis is substantially complete, a suitable organic solvent, e.g., chloroform, quackenbush solvent, acetone, etc., is added to the mixture and the combination is then agitated to allow the xanthophylls to disperse within the solvent. The aqueous and the organic phase will then separate with the majority of the xanthophylls being removed with the organic solvent. The aqueous residue can be rewashed with the organic solvent as often as desired.

A particularly desirable variation of the process described above involves the inclusion of a chelating agent immediately before or during the early stages of the enzymatic hydrolysis. Any common chelating agent can be used, such as EDTA or other polycarboxylic acids and their soluble salts. The addition of the chelating agents seem to greatly enhance the yield of xanthophylls resulting from enzymatic hydrolysis. It is suspected that the importance of the chelating agent relates to its prevention of the formation of melanin pigments. It has been theorized that tyrosine, an amino acid commonly found in conjunction with xanthophylls in plants, either reacts with or is in some way affected by the presence of a divalent metal ion so that it forms melanin. Melanin complexes xanthophylls and the complex is essentially useless as a yellow pigment agent. It also complexes cellulase which substantially inhibits its activity. It is theorized, that by preventing the formation of melanin, a chelating agent allows for the production of an increased amount of color-active extracted xanthophylls. In any event, the presence of a chelating agent increases the yield of xanthophylls resulting from the enzymatic extracting procedure described above.

EXAMPLE 1

This sample provides an illustration of the effect of enzyme treatment when compared to a simple enzymatic procedure.

1.0 g. of a cellulase enzyme preparation sold as Sigma Type 2 Practical (technical grade) sold by Sigma Chemical Company, St. Louis, Mo. and having a specific activity of 0.9 millimole of glucose released in 4 hrs./mg. at 47° C. was added to 5.0 g. of fresh marigold petals. 50 ml. of a 0.50 M acetate buffer solution at pH 4.5 was added to the mixture and this combination was maintained at 47° C. in a shaker bath for 24 hours. The flask was then removed and the 125 ml. of chloroform was added. The entire mixture was then shaken for 24 hours on a rotary shaker plate, after which the entire mixture was transferred to a separatory funnel and the chloroform which was added and had turned yellowish, and was drawn off from the bottom of the funnel. After 75 ml. portion of chloroform was then added to the aqueous residue, in the funnel, swirled and the chloroform was removed from the funnel as before. The second portion of chloroform was then added to the original portion of the chloroform and a 250 ml. portion of the two solutions diluted at a ratio of 10:1 and then read on a Bausch and Lomb Spectronic 20 spectrophotometer using an extinction co-efficient of $$\left(E_{1\ cm.}^{1\%}\right)_{454\ m\mu}$$

The extinction co-efficient is the commonly accepted literature value for xanthophyll (xanthophyll as used in this instance refers to the specific dihydroxy-a-carotene having the formula $C_{40}H_{56}O_2$ which is known also as vegetable lutein. Previously, throughout this specification when the terms xanthophylls or xanthophyllic pigments have been used that entire class of structurally similar carotenoids have been meant. In the marigold petal about 90% of the xanthophyllic pigment is xanthophyll, with the other pigments being so nearly chemically homologous that they have an extinction co-efficient virtually indistinguishable from xanthophyll. Therefore, the extinction co-efficient for xanthophyll is a close approximation of the average value of the extracted pigment although not a complete precise one.

It was found that an enzymatically treated sample contained 1600 p.p.m. xanthophylls as calculated on a wet basis, while a control sample ran with identical ingredients, under identical conditions, except that the enzyme was omitted, yielded 1180 p.p.m. of xanthophylls. Thus, 36% more xanthophylls was obtained by enzymatic treatment.

EXAMPLE 2

This example illustrates the effect of increasing amounts of cellulase on the amount of xanthophylls released. The cellulase used was the same one used in Example 1 and has a cellulase specific activity of 0.9 $\mu$m. glucose released 4 hrs./mg. cellulose.

Four samples were prepared with identical ingredients for each sample except for a variance in the level of cellulase. The formula for the samples are as follows:

Ingredients: Amount
  Marigold petals (fresh) _____g__ 5.0
  1.0 M acetate buffer (pH 4.5) _____ml__ 10.0
  Water _____ml__ 40.0
  Cellulase _____g__ 0.10, 0.20, 1.00 and 2.00

Each sample was incubated for four hours at 47° C., shaken with 125 ml. of chloroform extracted and tested as in Example 1.

This table below indicates the effect of the increasing amounts of enzyme on the level of xanthophyllic pigment extracted by the solvent.

TABLE 1

| Enzyme (g.): | Xanthophylls extracted (mg.) |
|---|---|
| 0.10 | 5.0 / 4.7 |
| 0.20 | 5.7 / 5.9 |
| 1.00 | 7.3 / 7.8 |
| 2.0 | 7.8 / 7.4 |

The higher levels of enzyme actually show diminished increase in extraction levels probably due to the melanin effect described above.

EXAMPLE 3

This example illustrates the effect of the addition of a chelating agent on the amount of xanthophylls extracted with enzyme hydrolysis. Eight separate samples were prepared with each sample containing 2.0 g. of fresh marigold petals, 5.0 ml. of a pH 4.5 acetate buffer solution and enough water to dilute the volume of the mixture to 50 ml. The table below indicates the difference between the samples and the amount of xanthophylls released for each sample. After the samples were prepared the enzyme and EDTA (where used) was added. Each sample was incubated for 22.5 hrs. at 53° C., shaken with 125 ml. of chloroform for 2 hrs. and extracted and tested as in the preceding example. Table 2 is indicative of the effect of the chelating agent in the extraction efficiency.

TABLE 2

| Sample No. | Trade name | Amount (mg.) | EDTA | Xanthophylls extracted (mg.) |
|---|---|---|---|---|
| 1 | Cellase 1000 | 1.0 | No | 0.20 |
| 2 | do | 10.0 | No | 0.76 |
| 3 | do | 1.0 | Yes | 2.08 |
| 4 | do | 1.0 | Yes | 1.76 |
| 5 | do | 10.0 | Yes | 3.78 |
| 6 | do | 10.0 | Yes | 3.20 |
| 7 | Sigma | 1,000.0 | No | 1.90 |
| 8 | do | 1,000.0 | No | 2.12 |

NOTE.—Cellase 1000 is the commercial designation for Pharmaceutical grade cellase made by Wallerstein Pharmaceutical Company, a division of Travenol Laboratories, Inc., Staten Island, N.Y. The activity of this enzyme is given as 1000 Wallerstein activity Units (W.C.A.)/g. and is based on the reduction of viscosity of standard sodium carboxymethyl cellulose solution at pH 5.0 in one hour. By including the Sigma enzyme, the table above also allows for the indirect comparison of strength of the different enzymes. This method is used because there is neither a standard method for calculating enzyme strength, nor literature available that shows a method for conversion from one of these methods to the other.

This example is also illustrative of the up to tenfold order of magnitude increase in extraction efficiency when a chelating agent is used.

EXAMPLE 4

This example illustrates the effect of another chelating agent, i.e. citric acid (0.05 M final concentration) on the amount of xanthophylls extracted by the process of this invention. The enzyme used in this example was "Cellzyme," a trademark of Wallerstein Pharmaceutical Company. The aqueous liquid enzyme solution has an activity of 200 W.C.A./g. Four samples were prepared and tested as in Example 3 with the results given in the table below.

TABLE 3

| Sample No. | Enzyme (ml.) | Xanthophylls (mg.) | Citric acid |
|---|---|---|---|
| 1 | 0.1 | 41 | No. |
| 2 | 1.0 | 22 | No. |
| 3 | 0.1 | 68 | Yes. |
| 4 | 1.0 | 185 | Yes. |

As the table shows, the addition of sodium citrate also aids the extraction, but not as efficiently as EDTA. The diminished level of xanthophylls in Sample No. 2 is believed due to the melanin complexing effect described above.

EXAMPLE 5

The choice of extraction solvents will also affect the efficiency of the process. It has been found that polar organic solvents are most efficient, but it is possible to extract with non-polar organic solvents as well. To illustrate this, three samples are prepared using thawed originally frozen marigold petals which were extracted as in Example 1. The results are shown in the table below.

TABLE 4

| Sample No. | Cellase 1000 | Solvent | Xanthophylls extracted (mg.) |
|---|---|---|---|
| 1 | Yes | Chloroform | 4.5 |
| 2 | Yes | Hexane | 1.3 |
| 3 | No | do | 0.2 |

As the table indicates, the hexane extraction with the enzyme is substantially less efficient than the extraction with chloroform. However, the extraction is still substantially improved by enzyme addition as can be seen by comparing Sample 2 and Sample 3.

I claim:
1. A process for the improved extraction of xanthophyllic pigments from plants comprising:
  (a) adding an aqueous solution of cellulase to a plant containing xanthophyllic pigments to form a mixture
  (b) adjusting the pH of said mixture to between about 4 and 6

(c) incubating the mixture to produce enzymatic hydrolysis of the cellulosic plant structure
(d) extracting the xanthophyllic pigments from the mixture by agitating with an organic solvent.

2. The process of claim 1 in which the incubation is maintained at from 4 to 24 hours at a temperature of about 45° C. to 55° C.

3. The process of claim 1 in which a chelating agent is added at the time of hyrolysis.

4. The process of claim 1 where the solvent is a non-polar organic solvent.

References Cited
UNITED STATES PATENTS
3,248,301  4/1966  Burdick _____ 195—2

OTHER REFERENCES

Ruesink et al.: Science, vol. 154, pp. 280–281, 1966.
Reese, et al.: Cellulose and Cellulose Derivatives, edited by Bikales et al., Part V, pp. 1090 and 1091, 1971.

A. LOUIS MONACELL, Primary Examiner
R. B. PENLAND, Assistant Examiner